(12) United States Patent
Agrawal et al.

(10) Patent No.: US 8,452,982 B2
(45) Date of Patent: May 28, 2013

(54) METHODS AND SYSTEMS FOR MIGRATING CONTENT LICENSES

(75) Inventors: Sunil Agrawal, Fremont, CA (US);
Kunal Shah, Milpitas, CA (US);
Katherine Nadell, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 193 days.

(21) Appl. No.: 12/915,349

(22) Filed: Oct. 29, 2010

(65) Prior Publication Data

US 2012/0110342 A1    May 3, 2012

(51) Int. Cl.
*G06F 21/00* (2006.01)
(52) U.S. Cl.
USPC .......................................... 713/189; 705/59
(58) Field of Classification Search
USPC .......................................... 713/189; 705/59
See application file for complete search history.

(56) References Cited

U.S. PATENT DOCUMENTS

| | | | | |
|---|---|---|---|---|
| 7,313,512 | B1 * | 12/2007 | Traut et al. ...................... | 703/23 |
| 2005/0289072 | A1 * | 12/2005 | Sabharwal ...................... | 705/59 |
| 2006/0212405 | A1 * | 9/2006 | Gordon et al. .................. | 705/59 |
| 2007/0043680 | A1 * | 2/2007 | Fox et al. ........................ | 705/59 |
| 2007/0174205 | A1 * | 7/2007 | Saito ............................... | 705/59 |
| 2008/0092221 | A1 | 4/2008 | Tan et al. | |

OTHER PUBLICATIONS

Adobe Systems Incorporated, "Adobe Flash Access 2.0," 7 pages, dated 2010.
Adobe Systems Incorporated, "Adobe Flash Access Overview on Protected Streaming," 5 pages, dated 2010.
Microsoft Corporation, Windows Media Personal License, available at http://www.microsoft.com/windows/windowsmedia/forpros/drm/pluwiz.aspx (last accessed Sep. 2, 2010), date unknown.
Non Final Office Action dated Sep. 27, 2012 in related U.S. Appl. No. 13/005,823, 10 pages.

* cited by examiner

*Primary Examiner* — Matthew Smithers
(74) *Attorney, Agent, or Firm* — Kilpatrick Townsend & Stockton LLP

(57) ABSTRACT

A system can comprise a processor and a memory embodying an application. The application can comprise code that causes the processor to identify a client key embedded or hard-coded in the application (i.e., included as part of the code comprising the application). Additional code causes the processor to identify data to be accessed according to an encrypted license accessible through use of a machine key. The application can maintain the machine key in an encrypted state using the client key. The application can include code that causes the processor to determine if an encrypted version of the machine key accessible by the processor can actually be decrypted using the client key. If so, the client key can be used to access the machine key. If not, the processor can request a differently-encrypted version of the machine key from a migration service.

21 Claims, 4 Drawing Sheets

METHODS AND SYSTEMS FOR MIGRATING CONTENT LICENSES

BACKGROUND

Digital content distribution is extremely popular. Most content producers desire some sort of rights management, and so content distribution systems typically include content management systems that control aspects of playback, copying, or other usage of the digital content. As one example, a device in the content distribution chain may be configured to enforce terms of a license provided by a content producer or other authority. The license is stored as one or more computer-accessible files or other data structures accessed by the device to enable (or deny) access or other use of the content.

SUMMARY

A system can comprise a processor and a memory, the memory embodying an application. The application may be a media player, a rights management application that controls another application, or another program component. The application can comprise program code that causes the processor to identify a client key embedded or hard-coded in the application (e.g., included as part of the code comprising the application). Additional program code causes the processor to identify content data to be accessed by the processor according to a license, the license encrypted according to a machine key separate from the client key. The application can use an unencrypted version of the machine key to access the license, which may itself comprise a key used to decrypt the content data.

The application can include program code that causes the processor to determine if an encrypted version of the machine key accessible by the processor can be decrypted using the client key. If so, the client key can be used to access the machine key. Additional program code causes the processor to request a differently-encrypted version of the machine key from a migration service if the encrypted version of the machine key accessible by the processor cannot be decrypted using the client key.

These illustrative embodiments are discussed not to limit the present subject matter, but to provide a brief introduction. Additional examples noted below in the Detailed Description include computer-readable media embodying client-side application code and computer-implemented methods for client-side aspects of a content distribution system. Still further embodiments include server-side devices, methods, and computer-readable media embodying server-side application code. Objects and advantages of the present subject matter can be determined upon review of the specification and/or practice of an embodiment in accordance with one or more aspects taught herein.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

Devices in a content management system that are configured according to one or more aspects discussed in this document can facilitate efficient migration of content licenses in the content management system.

Figure 1:
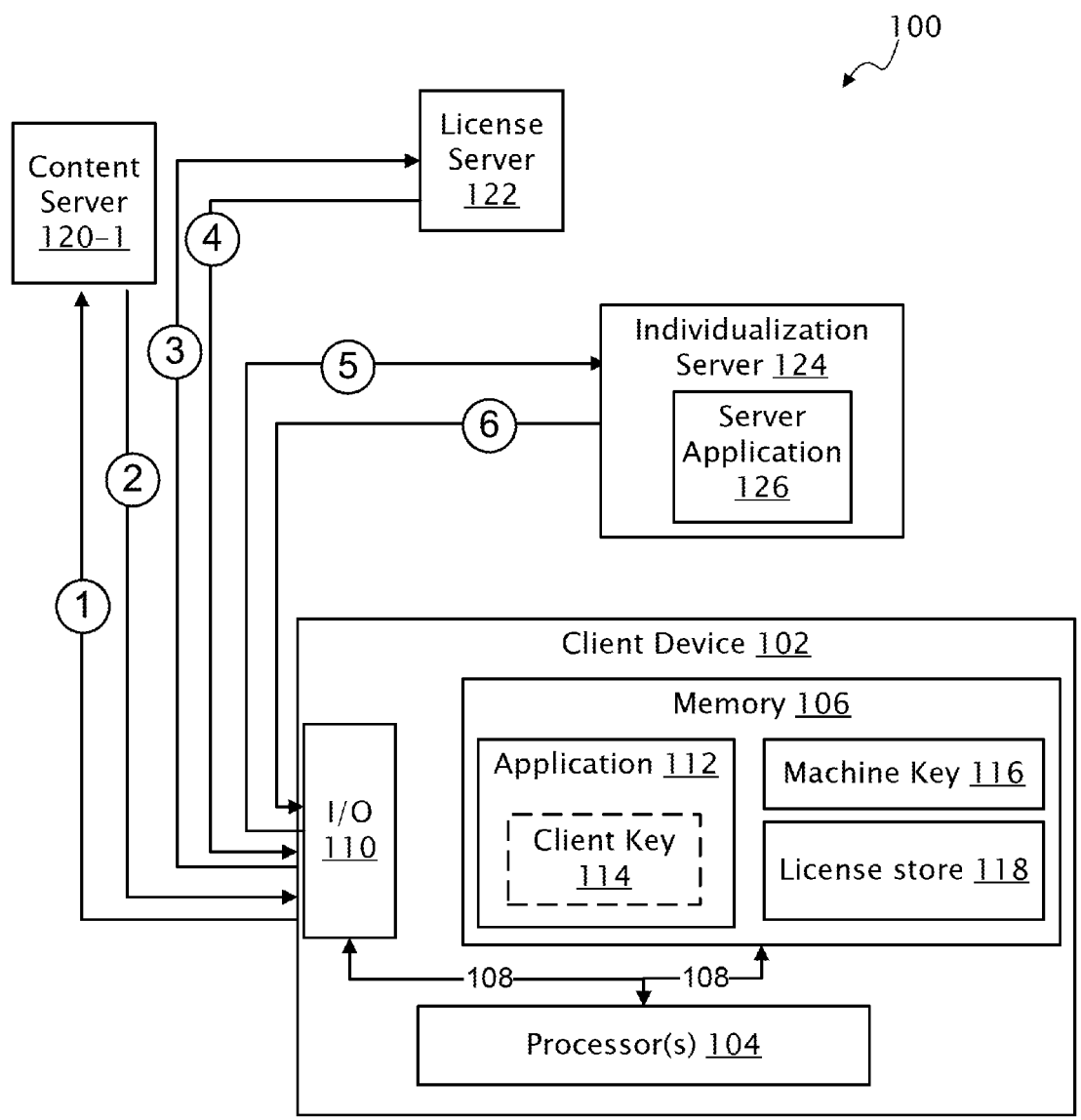
FIG. 1 is a diagram of an illustrative content distribution system comprising a client computing device and server computing device configured to support license migration.

FIG. 1 is a diagram of an illustrative content distribution system 100 comprising a client computing device 102. For example, device 102 may comprise a mobile device, a tablet computer, a mobile phone, an e-book reader, or another computing system (e.g., desktop, laptop, kiosk, set-top box, television, gaming system, etc.). In this example, client computing device 102 comprises a processor 104 and memory 106 linked by one or more busses 108. Memory 106 may comprise RAM, ROM, or other memory accessible by processor 104, and the memory space accessible by processor 104 may include other storage (e.g., hard disk, optical disk, networked storage, etc.).

I/O interfaces 110 represent various components used by processor 104 to provide and access data from resources outside of device 102. For example, interface(s) 110 may comprise a graphics interface (e.g., VGA, HDMI) to which a display is connected, a USB or other interface to which a keyboard, mouse, touch screen, or other input device connected. As shown here, interface(s) 110 comprise a networking component for communicating via wired or wireless communication, such as via Ethernet, IEEE 802.11 (Wi-Fi), 802.16 (Wi-Max), Bluetooth, infrared, etc. As another example, the networking component may allow for communication over communication networks, such as CDMA, GSM, UMTS, or other cellular communication networks.

In this example, client computing device 102 utilizes a rights management application 112 that controls playback or other access to content data according to one or more content licenses. The licenses may comprise decryption keys for the content, rights policies, and/or any other information used to control dissemination and/or use of the content. Rights management application 112 may be a DRM (digital rights management) enabled media player or other application, or may comprise a separate application or component that controls the operation of a media player, or other program component used to consume the content.

For example, a user may wish to access content data. In this example, the content data is maintained at content server 120-1. Accordingly, as shown at (1), client device 102 provides a request for the content data. In this example, the content data is only accessible according to terms of a license, so as shown at (2) content server 120-1 provides a response with a uniform resource indicator identifying license server 122. As shown at (3) and (4), client device 102 requests and obtains a license for the content of interest. As a particular example, an online service may allow users to rent or purchase the right to view content, such as movies or audio. The online service may maintain license server 122 to provide a license in exchange for payment, etc., after suitable authentication, the details of which are not shown here.

For example, the tasks of browsing to the content and submitting the request may be handled by a web browser, media player, or other application that relies on rights management application 112 to manage the license and access the content. As another example, rights management application 112 may itself comprise a media player, browser, or other component that renders the content and manages the licenses.

Rights management application 112 features a client key 114 that is embedded or "baked in" to code of application 112. For example, client key 114 can be coded into the program code comprising application 112 and not accessed as a separate data item external to the application itself. As another example, the client key could be "baked in" by including code in application 112 that causes application 112 to rely on a hardware key (e.g., a key embedded in hardware of client device 102 or accessible from a physical resource). Application 112 also has access to a machine key 116 unique to computing device 102. For example, as will be discussed below, application 112 may be "individualized" based on one or more characteristics of device 102 and can be provided a unique machine key 116. When license server 122 returns a license at (4), rights management application 112 may (if allowed by the terms of the license) store a copy of the license in license store 118. The license or portions thereof may be encrypted according to machine key 116—for example, the license may include a content key or other data that is encrypted using the machine public key prior to its return by license server 122. As another example, the content key could be encrypted by application 112 using machine key 116.

Once available to client device 102, the copy of the license can be used in processing the content data—for example, if the content data is encrypted, the license itself may as noted above include a key (a content key) for use in decrypting the content. Additionally or alternatively, the license can include other data defining usage policies that are followed by application 112. Client device 102 can receive a content stream from content server 120-1 and render the content as allowed by the license.

In this example, a network is used to access content from server 120-1. Of course, the present subject matter can be used regardless of how the content or license is provided to the client. For example, the content data may be locally stored if it was previously obtained from content server 120-1. As another example, the content may be accessed from a local resource (e.g., hard drive, optical drive, network storage, etc.) in a protected form, with a suitable license obtained from the network or even from a storage device in a manner provided by the rights holder.

At any given time, license store 118 may contain any number of licenses associated with different content. For example, the licenses may pertain to video or audio data, and/or to other data such as electronic books, applications, and/or other files of any type. Machine key 116 can be used to access the licenses, and machine key 116 itself is encrypted according to client key 114 to control access to licenses in license store 118. For example, machine key 116 may itself be maintained in a store (the "global state store" below) along with other data, with the global state store encrypted using client key 114.

A problem may arise if client key 114 is changed. For instance, client device 102 may download an updated version of rights management application 112 that includes one or more changes such as a stronger or different client key 114. As another example, a user may attempt to access the machine key and license store on a different device or otherwise attempt to use a different version of client application 112.

In such situations, the licenses of license store 118 are not accessible because machine key 116 is encrypted according to a version of client key 114 that is different from the client key embedded in application 112. Client device 102 may simply attempt to obtain a new machine key and rebuild store 118 by re-downloading all of the licenses, but this may not be feasible or possible—license providers may be unreachable and/or may not allow another download of a license without additional payment.

To address such a situation, rights management application 112 configures client device 102 to communicate with an individualization server 124. Server 124 uses comprises one or more computing devices, and thus comprises a processor, memory, I/O interface(s), etc. Server application 126 is provided by server 124 and provides a license migration service. In some implementations, server application 126 is provided by an individualization server as shown here, and that server can provide additional functionality (e.g., individualizing clients as noted later below). However, license migration tasks may be handled by an entirely separate server in some implementations.

Application 112 can determine if client key 114 can be used to decrypt the encrypted version of machine key 116 accessible by client device 102. If machine key 116 cannot be decrypted, then as shown at (5) client device 102 provides a request to a migration service. The migration service returns a differently-encrypted version of machine key 116 as shown at (6). In particular, the differently-encrypted version of machine key 116 is one that can be decrypted using the client key 114 embedded in application 112. Thus, the application's rights management capabilities can be updated by changing client key 114 without the need to discard the licenses as encrypted using the machine key 116.

Additionally, license and content providers are not required to take any additional actions. For instance, license server 122 is not inundated with replacement license requests, and an entity that provides license server 122 (and/or content server 120-1) need not concern itself with special handling of upgrades or changes to details of rights management application 112.

Server 124 or another server device can also support an individualization workflow. For example, the first time application 112 is executed at a client device 102 it may not have a machine key 116. To obtain a machine key, application 112 can provide a request to a suitable service, such as by providing a request to server 124. The server 124 can use one or more processes to generate machine key 116, such as generating a machine private key and a machine certificate (that contains the corresponding public key) based on information about client device 102 or other information. As an example, application 112 may create a hardware signature (e.g., processor type, memory, disk size, operating system, etc.) and include the signature with the individualization request. Server 124 can, for example, maintain a copy of the hardware signature for use in validating a later migration request, as detailed later below.

Figure 2:
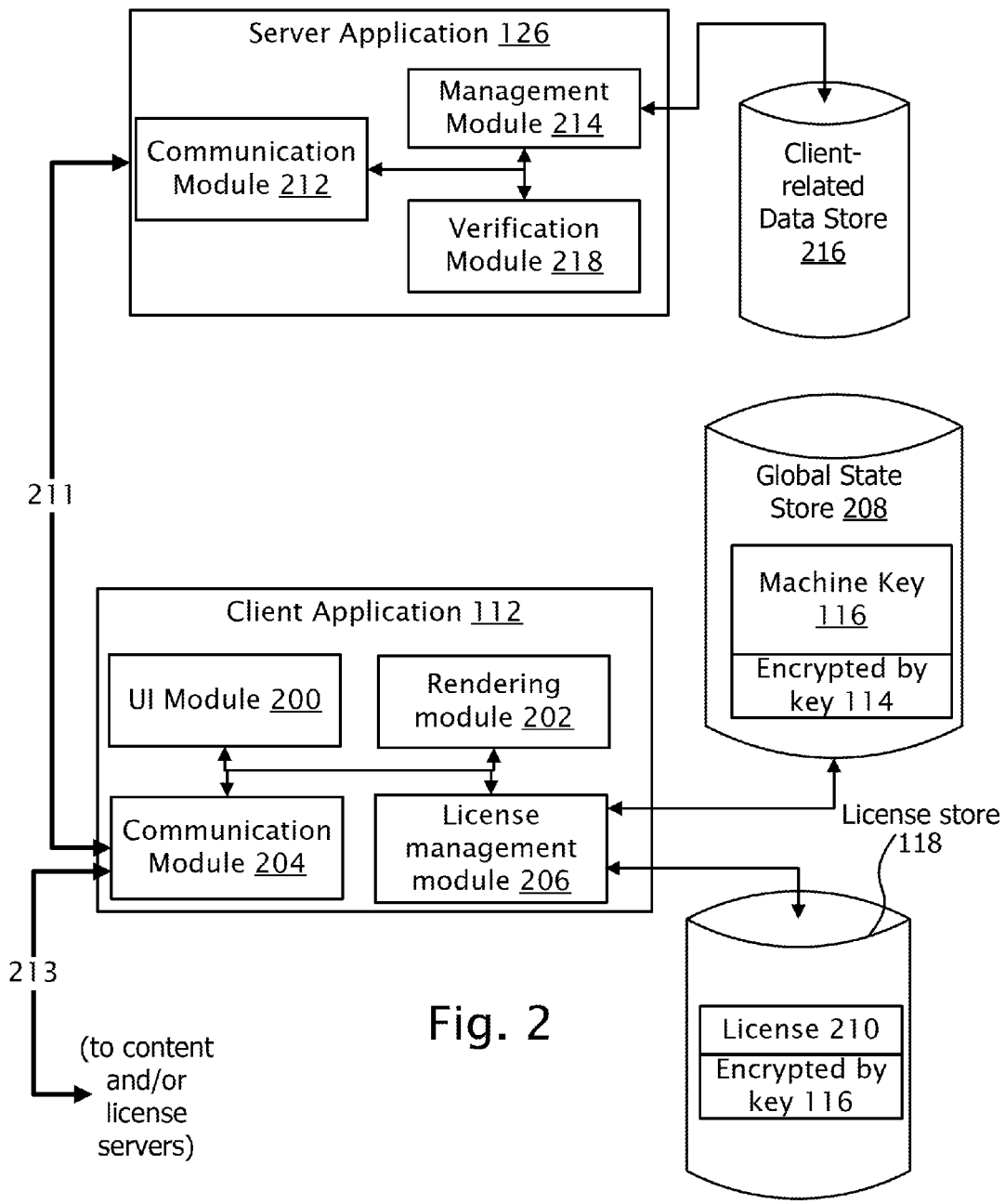
FIG. 2 is a diagram of an illustrative client application and an illustrative server application.

FIG. 2 is a diagram of an illustrative client application and an illustrative server application. Each application is, of course, executed by a respective computing system comprising one or more computing devices that can use processors, memory, etc. or other hardware.

In this example, client application 112 includes a UI module 200. As noted above, in some embodiments client application is a DRM-enabled media player. Thus, UI module 200 represents program code that causes the client processor to generate a user interface, receive input (if needed) and provide data to render an output (e.g., a graphical user interface for viewing files, streaming content, etc.). Rendering module 202 represents program code that causes the client to generate the output data. For example, for video and audio data, suitable codecs can be used to generate an output stream from the content data. For other applications, rendering module 202 can include suitable program logic to render (and/or edit) the content data—for example, if the protected content is a PDF document, rendering module 202 may read the PDF file, render pages, etc. As another example, rendering module 202 may render content of a game protected according to one or more licenses.

Rendering module 202 can also comprise code that causes the processor to use content data in accordance with a license 210. For example, license management module 206 may provide commands based on restrictions defined in the license (e.g., disabling certain controls, etc.) and the commands are respected by rendering module 202. As another example, license 210 may simply comprise a content decryption key used to decrypt the content. In that case, rendering module 202 will not be able to render the content unless it can be decrypted.

Client application 112 further includes communication module 204 and license management module 206. Communication module 204 can be used to access remote resources, such as via the Internet or another network represented at 211 and 213. License management module 206 represents program code that causes the processor to identify a client key included as part of code comprising the application. As noted above, in some implementations client key 114 (not shown in FIG. 2) can be hard-coded into the code of application 112. The code of application 112 can be configured so that, when client key 114 is to be used, application 112 looks to a code segment or hardware address expressly defining the set of values that constitute the key, rather than looking to an external data resource such as a key file.

License management module 206 comprises code that causes the processor to look for the license 210 in license store 118. As shown in FIG. 2, license 210 (or a portion thereof) is encrypted by machine key 116, either individually or because the entire license store 118 was previously encrypted using machine key 116. Thus, license management module 206 includes code that configures the processor to utilize machine key 116 (in unencrypted form) to access license 210. To facilitate this, license management module 206 further comprises program code that causes the processor to determine if the encrypted version of the machine key 116 that is accessible by the processor in global state store 208 can be decrypted using the client key 114. In this example, key 116 is included in global state store 208, which can also include other data, with the entire store 208 encrypted according to client key 114. However, embodiments may simply encrypt key 116 according to client key 114.

If the client key 114 that is embedded in application 112 can be used to decrypt machine key 116, then machine key 116 can be used to decrypt license 210 and then license 210 can be used as needed (e.g., to provide DRM enforcement commands, to decrypt content data according to a content key in license 210, etc.). However, if client application 112 has been altered, embedded client key 114 may not be usable to decrypt machine key 116. Thus, license management module 206 includes program code that causes the processor to request a differently-encrypted version of machine key 116 from a migration service if the encrypted version of machine key 116 cannot be decrypted using the client key 114.

Any suitable method can be used to determine if the encrypted version of key 116 can be decrypted. For example, in some implementations license management module 206 includes program code that causes the processor to attempt to decrypt the encrypted version of machine key 116 using the hard-coded client key 114. If the attempt fails, the differently-encrypted version of machine key 116 can be requested. As another example, license management module 206 may include code that causes the processor to use other data to determine if the client key has been changed. For example, status or configuration data associated with global state store 208 may indicate a client key version used to encrypt store 208. If the version used to encrypt store 208 does not match a version indicator for the hard-coded client key 114, then the differently-encrypted version of machine key 116 can be requested.

In some implementations, license management module 206 includes program code that configures the processor to submit a migration request including at least the encrypted version of machine key 116. However, additional data is included in some implementations.

For example, management module can maintain the encrypted version of the machine key in a secure store encrypted according to (old) client key 114. The secure store can comprise the unencrypted version of the machine key and also a device hardware fingerprint, such as a hardware certificate that includes a snapshot of the device hardware at the time of initial individualization. The request may further comprise a current device fingerprint generated by the management module at the time of the request. The secure store and hardware data can be submitted in the migration request so that the migration service can validate the migration request based at least in part on the hardware fingerprints. Alternatively, the encrypted version of machine key 116 alone could be submitted, with the request validated in another way.

In any event, the migration service returns at least machine key 116 as encrypted with the current client key 114. This is possible because, as explained below, the migration service can determine which (old) client key was used to encrypt machine key 116 and which (new) client key corresponds to the requesting client. Thus, the encrypted machine key 116 that is returned can be decrypted by the client.

As noted above, in some embodiments client application 112 is an application or component that communicates with another application that actually renders the content. In such cases, UI module 200 and rendering module 202, along with a communications module and other application-specific logic, could be included in a separate application configured to process content. Client application 112 could include an interface module to pass commands and data to the separate application in order to enforce license terms. As another example, client application 112 may simply grant or deny access to content data based on terms of license 210.

An illustrative server application 126 is also shown in FIG. 2. Server application 126 includes a communication module 212 that configures the server hardware to communicate with one or more client applications 112. A management module 214 includes code that configures the server to maintain data about various clients in client data store 216 and to respond to various requests as detailed below. Verification module 218 works with management module 214 to verify client requests against data maintained in client data store 216.

For example, communication module 212 may configure the server processor to communicate with client application 112 over a network connection (e.g., the Internet) and management module 214 can include program code that causes the server processor to receive the request for the differently-encrypted version of the machine key from client 112. Management module 214 can include code that determines the (old) client key 114 used to encrypt the machine key 116 included in the migration request as well as the (new) client key 114 to use in re-encrypting the machine key 116 (and other data, such as if the entire global state store 208 is submitted). This is because client-related data store 216 includes (or server otherwise has access to) access to all the client keys 114 that have been previously and currently hard-coded in client applications 112. Migration may be subject to verification, and verification module 218 can validate the request in any number of ways.

For example, in some implementations the migration request includes one or more device hardware fingerprints as noted above. Verification module 218 can include code that compares the hardware fingerprint against one stored in client-related data store 216, such as a fingerprint stored when the client was originally individualized. Module 218 can use a fuzzy matching algorithm in some implementations. One example is a three-way fuzzy matching algorithm to compare the initial hardware fingerprint, the hardware fingerprint included in the global state store, and the current hardware fingerprint as submitted in the request to accommodate normal hardware upgrades while ensuring that the fingerprint as stored and the current fingerprint in the request are sufficiently similar. Migration could be denied if the fingerprints do not match. As another example, implementations can use a two-way fuzzy matching comparison of the fingerprint included in the global state store and the fingerprint included in the migration request. Such an implementation would not necessarily rely on a stored fingerprint at the server.

The hardware fingerprint in the global state store can also be updated over time—for example, if migration is approved, then the migration server can encrypt or otherwise protect the current hardware fingerprint and add it to the global state store before encrypting the global state store according to the (new) client key 114.

Additionally or alternatively, verification module 218 can access data store 216 to determine how many times the client has already migrated. For example, verification module 218 can track the number of migrations performed by a particular device and enforce a limit on the number of times migration is permitted in order to detect or prevent abuse.

Additionally or alternatively, verification module 218 can check a credentialed client indicator in data store 216. For example, a client may be required to have approval before migration is allowed, with approval indicated in data store 216. As another example, data store 218 can include data identifying client devices and/or client keys 114 that have been revoked. If a request includes data encoded with a revoked key, the migration request may be denied.

Figure 3:
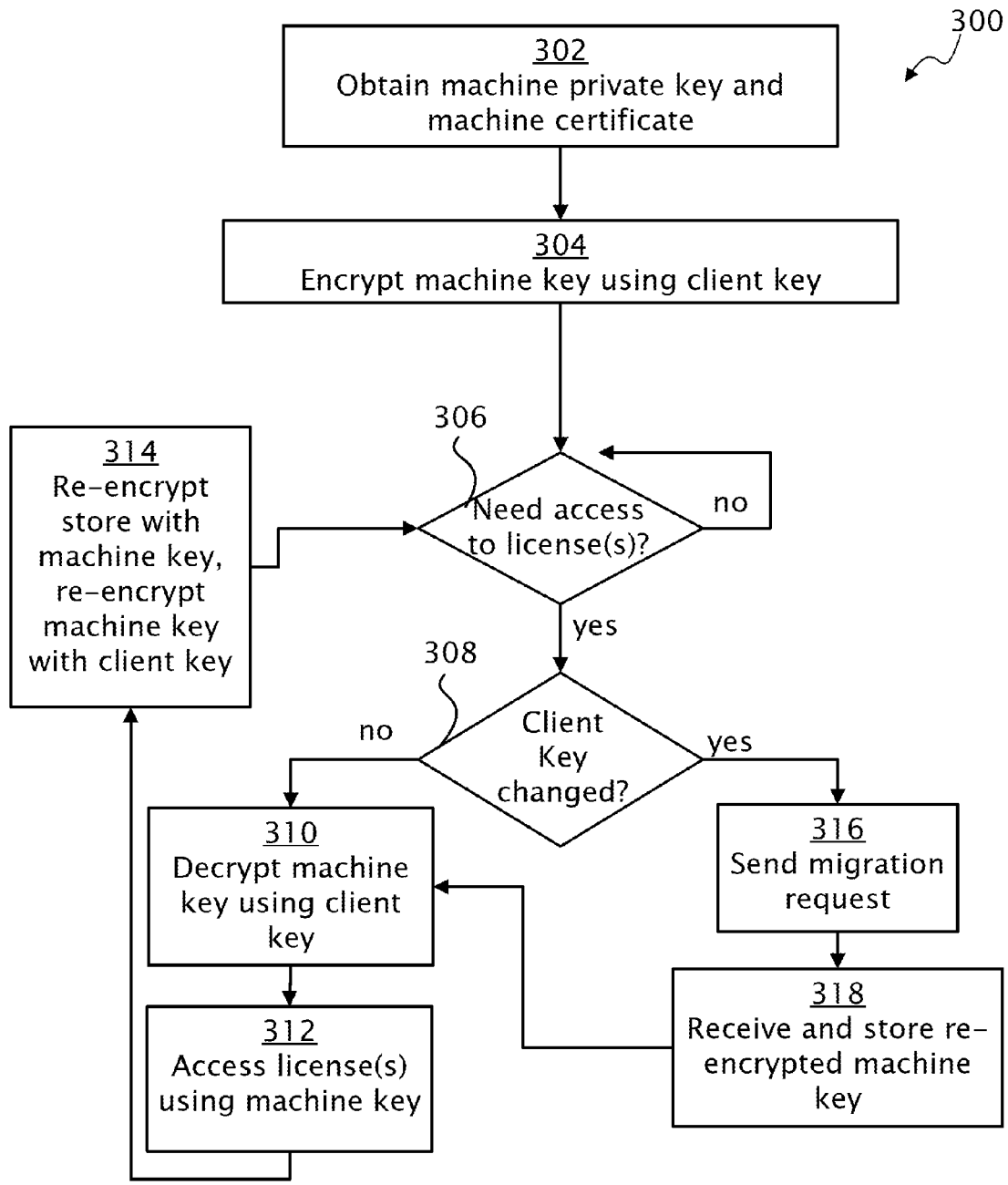
FIG. 3 is a flowchart showing steps in an illustrative method implemented by a client device in a content distribution system.

FIG. 3 is a flowchart showing steps in an illustrative method 300 implemented by a client device in a content distribution system. Block 302 represents an initial step of obtaining a machine private key (e.g., machine key 116) and a machine certificate. In some implementations, this is provided by the individualization server in response to an individualization request provided by the client device. The individualization request can include an initial machine hardware fingerprint that is stored and used in validating later migration requests. The individualization server may encrypt or sign the hardware fingerprint using a key known only to the individualization server and return the encrypted fingerprint in a machine certificate that also includes the machine key used in encrypting and decrypting the licenses at the client.

Block 304 represents encrypting the machine key using the client DRM key (i.e. client key 114). For example, the machine key may be placed in a global state store that is encrypted using client key 114. Blocks 302 and 304 are shown here along with additional blocks 306-318 of method 300, but it will be understood that in some cases, the method could begin at block 306 if individualization has already been carried out for the client at some previous time.

Block 306 represents determining if access to the license store (or even an individual license) is needed. For example, a new license may be received by the client, or the client may have received a request to access protected data according to a previously-received license. If so, the process proceeds to block 308.

Block 308 represents determining if the client key has changed since the last time the machine key was encoded. As mentioned above, this can be determined in a number of ways. For example, the client may simply try to decrypt the machine key using the hard-coded client key or may check an indicator or other data showing which client key was used to encrypt the machine key. If the client key has not changed, flow proceeds to block 310.

Block 310 represents decrypting the machine key using the client key hard-coded in the application. Then, flow proceeds to block 312, which represents accessing one or more licenses of the license store by using the (decrypted) machine key. If the entire license store is not encrypted, block 312 can represent accessing individual licenses, or portions thereof, using the machine key. If the entire license store is encrypted, then the license store itself can be decrypted.

With the machine key available, any needed operations can be performed, such as accessing and using licenses that have been encrypted according to the machine key. For instance, one or more licenses may include content keys used to decrypt encrypted video, audio, or other data, and those licenses can be used to view and alter content, run applications, and the like. As another example, if a new license has been provided, and the whole store is to be encrypted, the new license can be added to the store. When access to the license(s) is complete, flow moves to block 314.

In some implementations, block 314 represents encrypting the license store using the machine key and then encrypting the machine key using the hard-coded client key. A current hardware signature can be added to the global state store prior to encrypting the global state store (which also contains the machine key) with the client key. Of course, in some implementations the licenses and/or the global state store can be maintained in encrypted form and decrypted as needed using the machine key and client key, with no need for a step of re-encrypting. Instead, at block 314 the decrypted version of the licenses and the decrypted version of the machine key could be deleted from memory.

The client may access the machine key (and/or other data in the global state store, if used) any number of times without issue. However, a client may encounter a situation where access to one or more licenses is needed, but at block 308 the client determines that the client key has "changed"—i.e., the client key used to encrypt the machine key is not the same client key embedded in the client. In that event, flow moves to block 316.

Block 316 represents constructing and sending a migration request that includes at least the encrypted version of the machine key. In some implementations, the request also includes the global state store as encrypted, with the global state store including the machine key and client data, such as the last-added current hardware profile and the machine certificate. The request can also include additional client data outside the global state store, such as a current hardware snapshot and data about the embedded client key 114.

Block 318 represents receiving and storing the re-encrypted machine key. For example, a copy of the global state store that includes the machine key may be returned in response to a valid migration request, with the returned copy having been encrypted according to the client key 114 embedded in the client. Then, flow can proceed to block 310. If the migration request is denied, an error handler can be called.

Figure 4:
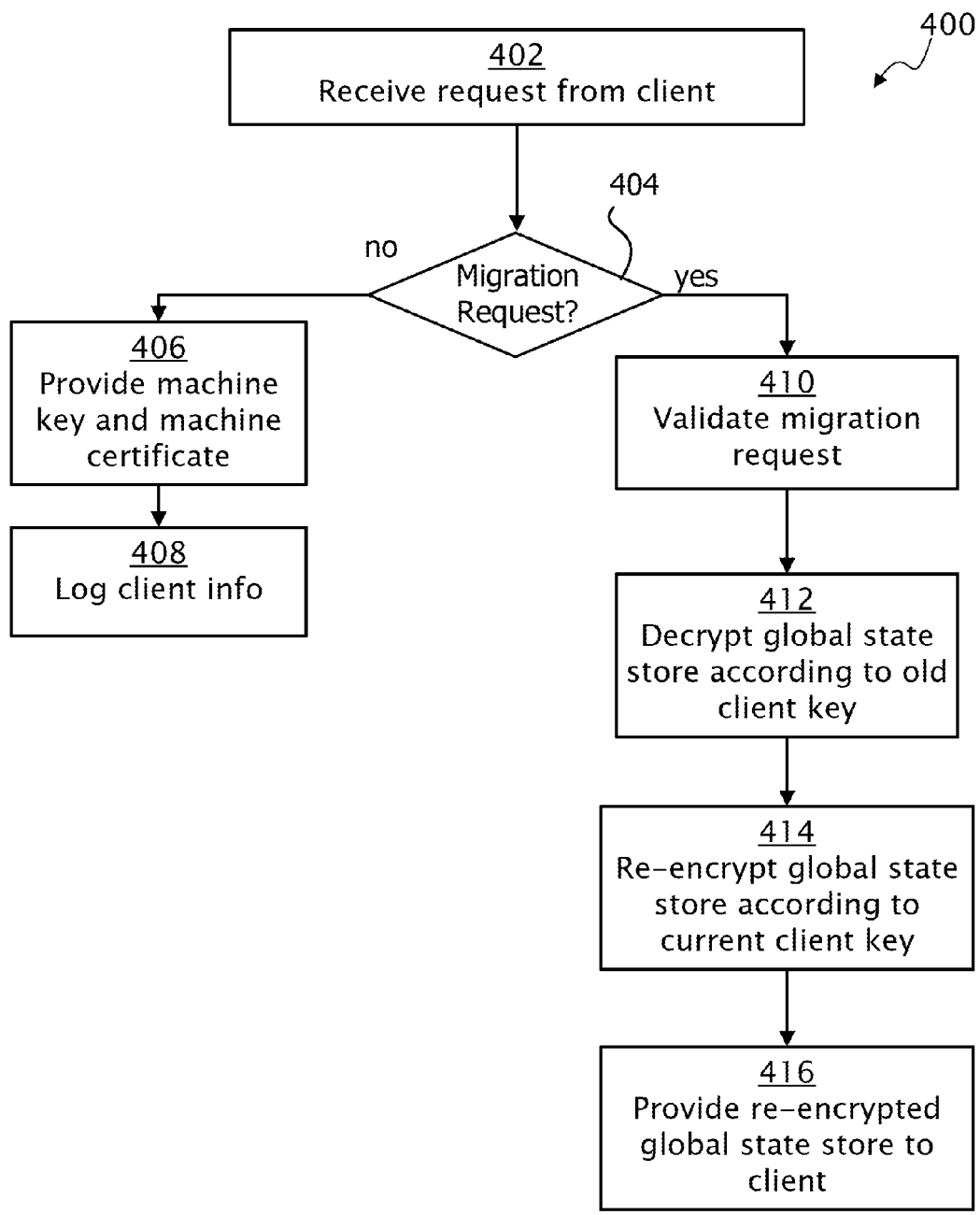
FIG. 4 is a flowchart showing steps in an illustrative method implemented by a server device in a content distribution system.

FIG. 4 is a flowchart showing steps in an illustrative method 400 implemented by a server device in a content distribution system. Block 402 represents receiving a request from a client, and at block 404 the request is analyzed. For example, the request may be an individualization request. If so, then flow moves from block 404 to block 406. Block 406 represents providing a machine key and machine certificate in response to the individualization request. For example, the request may include a current hardware fingerprint and/or other device information for logging by the individualization service.

The individualization request may be validated in some instances. For example, the requesting device or client application can be checked against log data to determine if the client has already been individualized. A limit on individualization requests can be enforced to avoid repeated generation of machine keys.

Assuming the individualization request is valid, then the hardware fingerprint can be included in a machine certificate that also includes the machine public key. A corresponding private key can be generated and the machine key and certificate can be provided to the client. Block 408 represents logging client information. For example, the machine key, client hardware signature at the time of the request, and other information about the request can be included in a database accessible for use in validating migration requests.

Returning to block 404, if a migration request is received, flow moves to block 410. Block 410 represents validating the migration request. As noted above, the migration request can contain client information, such as one or more hardware fingerprints that can be compared to stored data (and/or one another) to determine if the migration request truly represents a request made by the same device. For example, if a global state store is simply moved from one device to another, the hardware information stored at the server may match the information included in the global state store when the store is decrypted. However, the current hardware profile submitted with the request may differ too much from the hardware profile stored in the global state store and the hardware profile reflected in the machine certificate. In such a case, the request may be denied.

As another example, as noted above, a migration request may be denied if the requesting client's credentials have been revoked. For instance, in some implementations the migration request includes an identifier of the old client key used to encrypt the machine key, an identifier of the new client key (i.e., the one hard-coded or otherwise embedded in the requesting client), and proof that the requesting client actually possesses the new client key (such as data signed according to the embedded key and decryptable by a corresponding public key known to the server, or verification that the client has the private client key that can decrypt data encrypted according to the public client key). If either or both the old and new client key are associated with revoked credentials (e.g., if either key is associated with a breach) and/or the request indicates the requesting client may not actually have the new client key identified in the request, the request may be denied. Additionally or alternatively, a device identifier, IP address, or other identifier can be used to determine if migration is to be allowed. Still further, a number of migrations associated with the requesting client may be tracked, with an upper limit enforced by the migration server.

If the migration request is not valid at block 410, the server can send a denial message or simply not respond to the requesting client. Information associated with the request may be logged—for example, a copy of the global state store and/or other submitted data can be analyzed, along with any other relevant data about the requesting client.

If the migration request is valid at block 410, then flow moves to block 412. Block 412 represents decrypting the global state store using the corresponding client key 114 that was used to encrypt the store. The migration server can access a data store containing all of the client keys 114 that have been deployed, and so the correct key can be identified and used to decrypt the store. As mentioned above, the request may include an identifier of the client key 114 used to encrypt the store, and so the migration server can use that data in some implementations.

Block 414 represents re-encrypting the global state store according to the current client key. As just mentioned, the migration server has access to all the relevant keys, and so based on determining the key available to the client, the global state store can be re-encrypted in an appropriate manner. At block 416, the re-encrypted global state store can be provided to the client.

It will be understood that the present subject matter can be implemented in any suitable way. For example, individualization and migration requests themselves may occur over secure channels. The client key and machine key can be of any suitable configuration. Additionally, the examples of the type and use of content according to licenses is not meant to be limiting—the principles discussed herein can be applied to any type of content or other data protected by one or more licenses.

Server-based migration was discussed in several examples above. The principles above could be applied in a peer-based migration as well. For example, in FIG. 3 when the client determines at block 308 that it cannot decrypt the global state store, rather than sending a request at block 316 to a migration server, the client can invoke another client or component thereof. For example, the client may invoke a prior version of the client application (i.e., one with the embedded version of the client key 114 that encrypted the global state store) to decrypt the global state store and re-encrypt the global state store using the current client key. As another example, the prior version of the client could be commanded to pass the decrypted global state store to the client for the client to encrypt the global state store using the current client key. In such implementations, the client can include code to communicate with other versions of itself (i.e., when acting as the "current client" and the "prior version" client) and validate requests to migrate the machine key.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Although several examples featured mobile devices, the various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art

What is claimed:

1. A system, comprising:
   a processor; and
   a memory,
   wherein the memory embodies an application comprising:
      program code that causes the processor to identify a client key;
      program code that causes the processor to identify content data to be accessed by the processor according to a license, the license encrypted according to a machine key separate from the client key, wherein the license comprises a content key encrypted using the machine key for decrypting the data, wherein the machine key is generated based on information about a device including the processor;
      program code that causes the processor to determine that an encrypted version of the machine key accessible by the processor cannot be decrypted using the client key; and
      program code that causes the processor to request a differently-encrypted version of the machine key from a migration service based on determining that the encrypted version of the machine key accessible by the processor cannot be decrypted using the client key.

2. The system of claim 1, wherein the application further comprises:
   program code that causes the processor to receive the differently-encrypted version of the machine key from the migration service; and
   program code that causes the processor to use the client key to decrypt the differently-encrypted version of the machine key.

3. The system of claim 2, wherein the application further comprises:
   program code that causes the processor to use an unencrypted version of the machine key to decrypt the license; and
   program code that causes the processor to use the license when processing the content data.

4. The system of claim 3, wherein the program code that causes the processor to use the license when processing the content data comprises program code that causes the processor to use a content key included in the license to decrypt the content data.

5. The system of claim 1,
wherein the application comprises program code that causes the processor to maintain the encrypted version of the machine key in a secure store encrypted using the client key, and
wherein the secure store comprises the machine key as encrypted using the client key and a device hardware fingerprint.

6. The system of claim 5,
wherein the program code that causes the processor to request the differently-encrypted version of the machine key from the migration service comprises code that causes the processor to submit a migration request,
wherein the migration request comprises the secure store, and
wherein the application comprises program code that causes the processor to replace the secure store with a differently-encrypted version of the secure store returned by the migration service, the machine key included in the secure store.

7. The system of claim 1, wherein the program code that causes the processor to determine that the encrypted version of the machine key cannot be decrypted using the client key comprises program code that causes the processor to attempt to decrypt the encrypted version of the machine key using the client key.

8. The system of claim 1, wherein the program code that causes the processor to determine that the encrypted version of the machine key cannot be decrypted using the client key comprises program code that causes the processor to determine that the client key has been changed.

9. The system of claim 1, further comprising:
a server comprising a server processor and a server memory, the server memory embodying a second application that configures the server to provide the migration service, the second application comprising:
program code that causes the server processor to receive the request for the differently-encrypted version of the machine key from a client;
program code that causes the server processor to validate the request;
program code that causes the server processor to identify the client key;
program code that causes the server processor to access an unencrypted version of the machine key and encrypt the machine key using the client key; and
program code that causes the server processor to provide the machine key as encrypted by the server to the client.

10. A method, comprising:
receiving, by a server comprising a processor and memory, a migration request from a client, the migration request comprising a machine key as encrypted according to a first client key, wherein the machine key is generated based on information about the client;
validating, by the server, the migration request;
determining, by the server, the first client key used to encrypt the machine key;
identifying, by the server, a second client key associated with the client; and
providing, by the server, the machine key as encrypted using the second client key, to the client.

11. The method of claim 10,
wherein the machine key as encrypted according to the first client key is comprised in an encrypted store that is encrypted according the first client key and included in the migration request,
wherein the encrypted store further comprises a hardware fingerprint, and
wherein validating the migration request comprises:
accessing the hardware fingerprint, wherein the hardware fingerprint is associated with the client, and
determining that the migration request is valid based on comparing the hardware fingerprint comprised in the store to the accessed hardware fingerprint.

12. The method of claim 11, further comprising:
prior to receiving the migration request, receiving an individualization request from the client, the individualization request comprising the hardware fingerprint and providing the machine key in response,
wherein the hardware fingerprint comprised in the individualization request is stored in a location accessible to the server and corresponds to the hardware fingerprint used when validating the migration request.

13. The method of claim 10, wherein validating the migration request comprises:
accessing data representing a number of migrations associated with the client, and
determining that the migration request is valid based on comparing the number of migrations associated with the client to a threshold value.

14. The method of claim 10, wherein validating the migration request comprises:
determining if migration privileges of the client have been revoked.

15. The method of claim 10,
wherein the migration request is received from the client that is executing a client application defined by program code, the program code capable of decrypting the machine key as encrypted using the second client key but not capable of decrypting the machine key as encrypted using the first client key, the client application further configured to use the machine key to decrypt a license, wherein the license comprises a content key encrypted using the machine key for decrypting the data.

16. A computer program product comprising a non-transitory computer readable medium embodying code executable by a computing system comprising at least one processor, the code comprising:
program code defining a client key;
program code that, when executed, causes the processor to identify content data encrypted according to a license, the license encrypted according to a machine key, wherein the license comprises a content key encrypted using the machine key for decrypting the data, wherein the machine key is different from the client key and is generated based on information about a device including the processor;
program code that, when executed, causes the processor to determine that an encrypted version of the machine key accessible by the processor cannot be decrypted using the client key; and
program code that, when executed, causes the processor to request a differently-encrypted version of the machine key from a remote service based on determining that the encrypted version of the machine key accessible by the processor cannot be decrypted using the client key.

17. The computer program product of claim 16, further comprising:

program code that, when executed, causes the processor to receive the differently-encrypted version of the machine key from the remote service; and program code that causes the processor to use the client key to decrypt the differently-encrypted version of the machine key.

18. The computer program product of claim 16, further comprising:

program code that causes the processor to use an unencrypted version of the machine key to decrypt the content data encrypted according to the machine key; and program code that, when executed, causes the processor to provide output data based on the decrypted content data.

19. The computer program product of claim 18, wherein the content data encrypted according to the machine key comprises a content license, and wherein the program code that causes the processor to provide the output data comprises program code that, when executed, causes the processor to use the license when rendering the content data.

20. The computer program product of claim 19, wherein the program code that causes the processor to use the license when rendering the content data comprises program code that, when executed, causes the processor to use a content key comprised in the license to decrypt the content data.

21. A method comprising:

identifying, by a processor, a client key;

identifying, by the processor, content data to be accessed by the processor according to a license, the license encrypted according to a machine key separate from the client key, wherein the license comprises a content key encrypted using the machine key for decrypting the data, wherein the machine key is generated based on information about a device including the processor;

determining, by the processor, that an encrypted version of the machine key accessible by the processor cannot be decrypted using the client key; and requesting, by the processor, a differently-encrypted version of the machine key from a migration service based on determining that the encrypted version of the machine key accessible by the processor cannot be decrypted using the client key.

\* \* \* \* \*